United States Patent
Torsner et al.

(10) Patent No.: US 10,567,119 B2
(45) Date of Patent: Feb. 18, 2020

(54) METHOD AND SYSTEM OF RETRANSMISSION

(71) Applicant: TELEFONAKTIEBOLAGET LM ERICSSON (PUBL), Stockholm (SE)

(72) Inventors: Johan Torsner, Kyrkslätt (FI); Janne Peisa, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/803,331

(22) Filed: Nov. 3, 2017

(65) Prior Publication Data

US 2018/0062795 A1 Mar. 1, 2018

Related U.S. Application Data

(63) Continuation of application No. 14/016,411, filed on Sep. 3, 2013, now Pat. No. 9,838,160, which is a continuation of application No. 10/551,941, filed as application No. PCT/SE03/00589 on Apr. 10, 2003, now abandoned.

(51) Int. Cl.
*H04L 1/18* (2006.01)

(52) U.S. Cl.
CPC .......... *H04L 1/1809* (2013.01); *H04L 1/18* (2013.01); *H04L 1/1835* (2013.01); *H04L 1/1841* (2013.01); *H04L 1/1845* (2013.01)

(58) Field of Classification Search
None
See application file for complete search history.

(56) References Cited

U.S. PATENT DOCUMENTS

| | | | |
|---|---|---|---|
| 4,941,089 A * | 7/1990 | Fischer | G06F 13/128 370/419 |
| 5,570,367 A | 10/1996 | Ayanoglu et al. | |
| 6,424,625 B1 * | 7/2002 | Larsson | H04L 1/1806 370/236 |
| 6,618,375 B2 | 9/2003 | Rezaiifar et al. | |
| 6,816,471 B1 * | 11/2004 | Ludwig | H04L 1/1874 370/331 |
| 6,865,163 B1 * | 3/2005 | Bergenwall | H04L 1/0007 370/288 |
| 6,895,011 B1 | 5/2005 | Lassers | |

(Continued)

FOREIGN PATENT DOCUMENTS

| | | |
|---|---|---|
| EP | 1286491 A1 | 2/2003 |
| EP | 1337075 A2 | 8/2003 |

(Continued)

OTHER PUBLICATIONS

Universal Mobile Telecommunications Systems (UMTS); Medium Access Control (MAC) protocol specification (3GPP TS 25.321 v5.3.0 Release 5). ETSI TS 125 321 v5.3.0 (Dec. 2002).

(Continued)

*Primary Examiner* — Mujtaba M Chaudry (57) ABSTRACT

The present invention relates to retransmissions in a communications system. A method and system of reducing uplink retransmission delay of a radio communications system by introducing an uplink MAC ARQ layer of Node B is disclosed. Further, a MAC PDU data indicator for soft combining control in Node B and RLC PDU reordering is introduced.

11 Claims, 7 Drawing Sheets

(56) References Cited

U.S. PATENT DOCUMENTS

| | | | |
|---|---|---|---|
| 6,901,063 B2 * | 5/2005 | Vayanos | H04L 1/1845 370/335 |
| 6,947,737 B2 | 9/2005 | Massie et al. | |
| 7,330,439 B1 | 2/2008 | Puuskari et al. | |
| 7,339,949 B2 | 3/2008 | Suzuki et al. | |
| 2001/0030965 A1 * | 10/2001 | Tourunen | H04L 1/1657 370/394 |
| 2002/0001296 A1 * | 1/2002 | Lee | H04L 1/0066 370/338 |
| 2002/0009999 A1 * | 1/2002 | Lee | H04L 1/0069 455/454 |
| 2002/0021698 A1 | 2/2002 | Lee et al. | |
| 2002/0080719 A1 * | 6/2002 | Parkvall | H04L 1/0001 370/235 |
| 2002/0172208 A1 | 11/2002 | Malkamaki | |
| 2002/0176362 A1 | 11/2002 | Yun et al. | |
| 2003/0007480 A1 | 1/2003 | Kim et al. | |
| 2003/0007510 A1 | 1/2003 | Yeo et al. | |
| 2003/0016698 A1 | 1/2003 | Chang et al. | |
| 2003/0099211 A1 * | 5/2003 | Moulsley | H04L 1/1692 370/328 |
| 2003/0147371 A1 * | 8/2003 | Choi | H04B 7/2637 370/341 |
| 2004/0013105 A1 * | 1/2004 | Ahmavaara | H04L 1/1819 370/349 |
| 2004/0013115 A1 * | 1/2004 | Su | H04L 1/0083 370/392 |
| 2004/0042436 A1 | 3/2004 | Terry et al. | |

FOREIGN PATENT DOCUMENTS

| | | |
|---|---|---|
| WO | 0033503 A1 | 6/2000 |
| WO | 02064797 A1 | 8/2002 |
| WO | 02091659 A2 | 11/2002 |
| WO | 02096044 A1 | 11/2002 |
| WO | 03019376 A1 | 3/2003 |
| WO | 03096600 A1 | 11/2003 |

OTHER PUBLICATIONS

3GPP TS 25.301, Radio Interface Protocol Architecture, v3.1.0. TSG-RAN Working Group 2 (Radio layer 2 and Radio layer 3). TSGR2#6(99) 708. Aug. 1999.

Ericsson, et al. "HARQ Text Proposal for Section 7 of TR25.896" 3GPP TSG-RAN WG1 #31 R1-03-0208, Feb. 18, 2003.

Nokia, Enhanced Uplink DCH Physical Layer Structure—TTI vs. HARQ Structure 3GPP TSG-RAN WG1 #31, R1-03-0331, Feb. 20, 2003.

Samsung, HARQ Protocol for EUDCH: Some Considerations, TSG-RAN WG1 #30, R1-03-0064, Jan. 7-10, 2003.

3rd Generation Partnership Project: Technical Specification Group Radio Access Network; High Speed Downlink Packet Access (HSDPA); Overall Description; Stage 2 (Release 5). 3GPP TS 25.308 v5.3.0. pp. 1-29. Dec. 31, 2002.

Haitao, et al., TPC Performance Analysis of COMA Systems with RLP and MAC Layer Retransmissions, Modeling, Analysis and Simulation of Computer and Telecommunications Systems, 2002. Mascots 2002. Proceedings. 10th IEEE International Symposium. pp. 313-320, see abstract, section 2 and 2.1 and figure 1.

Chatterjee, et al., MAC Layer Retransmissions in 1XTREME, Personal, Indoor and Mobile Radio Communications, 2002. The 13th IEEE International Symposium on Sep. 15-18, 2002, pp. 1452-1456 vol. 3, see abstract and figure 2.

* cited by examiner

METHOD AND SYSTEM OF RETRANSMISSION

CROSS-REFERENCE TO RELATED APPLICATIONS

This application is a continuation of U.S. application Ser. No. 14/016,411 filed Sep. 3, 2013 which is a continuation of U.S. application Ser. No. 10/551,941, filed Sep. 14, 2006, which is the National Stage of International Application No. PCT/SE2003/00589 filed Apr. 10, 2003, the disclosures of which are incorporated herein by reference.

TECHNICAL FIELD OF THE INVENTION

The present invention relates to retransmissions in a communications system, and more especially it relates to a cellular mobile radio system, particularly to a Universal Mobile Telecommunications System, UMTS or WCDMA system.

BACKGROUND AND DESCRIPTION OF RELATED ART

Retransmission of data to or from a mobile station, MS, or user equipment, UE, is previously known. It is also known to use medium access control and radio link control layers of a UMTS protocol structure in acknowledged mode for dedicated channels.

In acknowledged mode, retransmissions are undertaken in case of detected transmission errors not recovered by forward error control. This is also called automatic repeat request, ARQ. With ARQ, retransmissions can be undertaken unless a transmitted message is (positively) acknowledged. Retransmissions could also be initiated at explicit negative acknowledgments of transmitted messages. Generally, there are time limits for the respective positive and negative acknowledgements to be considered.

Within this patent application, a radio network controller, RNC, is understood as a network element including a radio resource controller. Node B is a logical node responsible for radio transmission/reception in one or more cells to/from a User Equipment. A base station, BS, is a physical entity representing Node B.

Medium access control, MAC, and radio link control, RLC, is used within radio communications systems like General Packet Radio Services, GPRS, and UMTS.

U.S. Pat. No. 5,570,367 discloses a wireless communications system arranged to transmit acknowledgement and request for retransmission messages. Data received in a microcell from an end user device is forwarded to a cell site. Data received by the cell site is transmitted to a cellular switch. A base station sends a poll message to the end user device, inquiring for the status of unacknowledged messages previously transmitted from the base station.

Also, a base station transmitter window is defined. A lower end pointer identifies a lowest numbered packet transmitted to and acknowledged by the base station. The upper end pointer identifies the highest numbered packet transmitted by the base station. Consequently, the window represents packets transmitted by the base station and unacknowledged by the end user device.

International Patent Application WO02096044 reveals a method and system of reducing or eliminating transmissions over a scarce communication link resource in a communications system by establishing an image of downlink transmissions status.

International Patent Application PCT/SE02/02186 includes a method and system for in-sequence delivery of RLC PDUs, transmitted in downlink direction, to a user equipment at handover.

3rd Generation Partnership Project (3GPP): *Technical Specification Group Radio Access Network, Physical Layer Procedures, 3G TS* 25.301 *v*3.6.0, France, September 2000, specifies in chapter 5 Radio Interface Protocol Architecture of a UMTS system. There are three protocol layers:
physical layer, layer 1 or L1,
data link layer, layer 2 or L2, and
network layer, layer 3 or L3.

Layer 2, L2, and layer 3, L3 are divided into Control and User Planes. Layer 2 consists of two sub-layers, RLC and MAC, for the Control Plane and four sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

Figure 1:
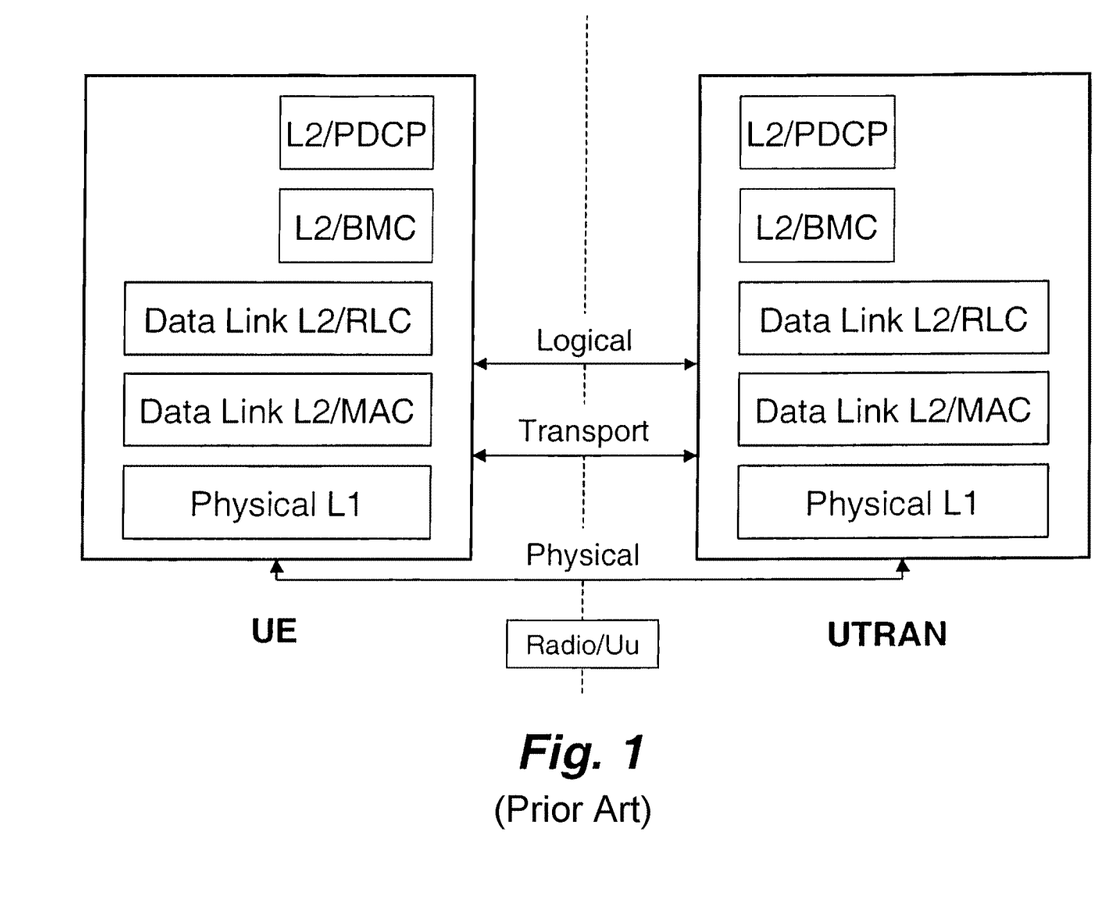
FIG. 1 displays a layered protocol structure, according to prior art, in a radio communications system.

FIG. 1 illustrates a simplified UMTS layers 1 and 2 protocol structure for a Uu Stratum, UuS, or Radio Stratum, between a user equipment UE and a Universal Terrestrial Radio Access Network, UTRAN.

Radio Access Bearers, RABs, make available radio resources (and services) to user applications. For each mobile station there may be one or several RABs. Data flows (in the form of segments) from the RABs are passed to respective Radio Link Control, RLC, entities which amongst other tasks buffer the received data segments. There is one RLC entity for each RAB. In the RLC layer, RABs are mapped onto respective logical channels. A Medium Access Control, MAC, entity receives data transmitted in the logical channels and further maps logical channels onto a set of transport channels. In accordance with subsection 5.3.1.2 of the 3GPP technical specification MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and time-slot. The DSCH (Downlink Shared Channel), e.g., is mapped onto one or several physical channels such that a specified part of the downlink resources is employed. As further described in subsection 5.2.2 of the 3GPP technical specification the L1 layer is responsible for error detection on transport channels and indication to higher layer, FEC encoding/decoding and interleaving/deinterleaving of trans-port channels.

PDCP provides mapping between Network PDUs (Protocol Data Units) of a network protocol, e.g. the Internet protocol, to an RLC entity. PDCP compresses and decompresses redundant Network PDU control information (header compression and decompression).

For transmissions on point-to-multipoint logical channels, BMC stores at UTRAN-side Broadcast Messages received from an RNC, calculates the required transmission rate and requests for the appropriate channel resources. It receives scheduling information from the RNC, and generates schedule messages. For transmission the messages are mapped on a point-to-multipoint logical channel.

At the UE side, BMC evaluates the schedule messages and deliver Broadcast Messages to upper layer in the UE.

3G TS 25.301 also describes protocol termination, i.e. in which node of the UTRAN the radio interface protocols are terminated, or equivalently, where within UTRAN the respective protocol services are accessible.

3rd Generation Partnership Project (3GPP): *Technical Specification Group Radio Access Network, Physical Layer Procedures, 3G TS 25.322 v3.5.0*, France, December 2000, specifies the RLC protocol. The RLC layer provides three services to the higher layers:

transparent data transfer service,
unacknowledged data transfer service, and
acknowledged data transfer service.

In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used. The 3GPP technical specification also reveals various triggers for a status report to be transmitted. The receiver shall always send a status report, if it receives a polling request. There are also three status report triggers, which can be configured 1. Missing PU(s) Detected,
2. Timer Initiated Status Report, and
3. Estimated PDU Counter.

For trigger 1, the receiver shall trigger transmission of a status report to the sender if a payload unit, PU, is detected to be missing. (One PU is included in one RLC PDU.) With trigger 2, a receiver triggers transmission of a status report periodically according to a timer. Finally, trigger 3 relates in short to a timer corresponding to an estimated number of received PUs before the requested PUs are received. The 3GPP Technical Specification specifies a status PDU used to report the status between two RLC AM ('Acknowledged Mode') entities.

3rd Generation Partnership Project (3GPP): *Technical Specification Group Radio Access Network, High Speed Downlink Packet Access (HSDPA), Overall Description, 3G TS 25.308 v5.3.0*, France, December 2002, describes the overall support of High Speed Downlink Packet Access in UTRA. FIGS. 5.1-1 and 5.1-2 illustrate protocol architecture of HS-DSCH. Chapter 6 specifies HS-DSCH MAC architecture for the downlink.

3rd Generation Partnership Project (3GPP): *Technical Specification Group Radio Access Network, UTRAN Overall Description, 3G TS 25.401 v4.5.0*, France, September 2002, describes the overall architecture of UTRAN, including internal interfaces and assumptions on radio and Iu interfaces. Section 11.2.5 presents the DSCH Transport channel. DSCH scheduling is performed by MAC-c/sh in the CRNC.

3rd Generation Partnership Project (3GPP): *Technical Specification Group Radio Access Network, Physical layer aspects of UTRA High Speed Downlink Packet Access, 3G TS 25.848 v4.0.0*, France, March 2001, describes, among other things, physical layer aspect of the techniques behind the concept of high-speed downlink packet access (HSDPA). Section 6.3.1 presents a complexity analysis of a dual channel stop-and-wait protocol for downlink hybrid ARQ.

3rd Generation Partnership Project (3GPP): *Technical Specification Group Radio Access Network, Physical layer aspects of UTRA High Speed Downlink Packet Access, 3G TS 25.950 v4.0.0*, France, March 2001, describes several techniques for facilitating high-speed downlink packet access. Chapter 8 describes various properties of stop-and-wait hybrid ARQ.

None of the cited documents above discloses a method and system of reducing uplink retransmission delay of a radio communications system by introducing an uplink MAC ARQ layer of Node B. Further, none of the cited documents mentions a MAC PDU data indicator for soft combining control in Node B.

SUMMARY OF THE INVENTION

Cited prior art references describe retransmissions between a UE and an RNC. According to preferred embodiments of the invention, transmissions and retransmissions are partially terminated in Node B, rendering soft combining of subsequent transmissions possible. Corresponding acknowledgements (positive or negative), if any, are terminated in UE.

Current WCDMA uplink connections has a latency in an approximate range of 100-150 ms. This latency is of such an amount that for some humans it is considered annoying, e.g., when using interactive services over the connection.

Further, present WCDMA releases provide wide area coverage for uplink data rates of 384 kbps. Applications proposed or recently presented require high peak rates in the uplink.

Consequently, it is an object to reduce transmission delay and latency over a scarce resource such as a radio interface.

A further object is to generate ARQ status reports in Node B and to render possible soft combining of subsequent (re-)transmissions.

It is also an object to segment RLC PDUs into MAC PDUs suitable for transmission in one transmission time interval, that may be shorter than allowed transmission time intervals of present WCDMA releases.

Finally, it is an object to introduce a reordering entity of RNC, handling RLC-PDUs received out of order, for improved out-of-order handling at RNC.

These objects are met by the invention, which is particularly well suited for a high-speed uplink packet access channel of an evolved universal mobile telecommunications system.

Preferred embodiments of the invention, by way of examples, are described with reference to the accompanying drawings below.

DESCRIPTION OF PREFERRED EMBODIMENTS

Figure 2:
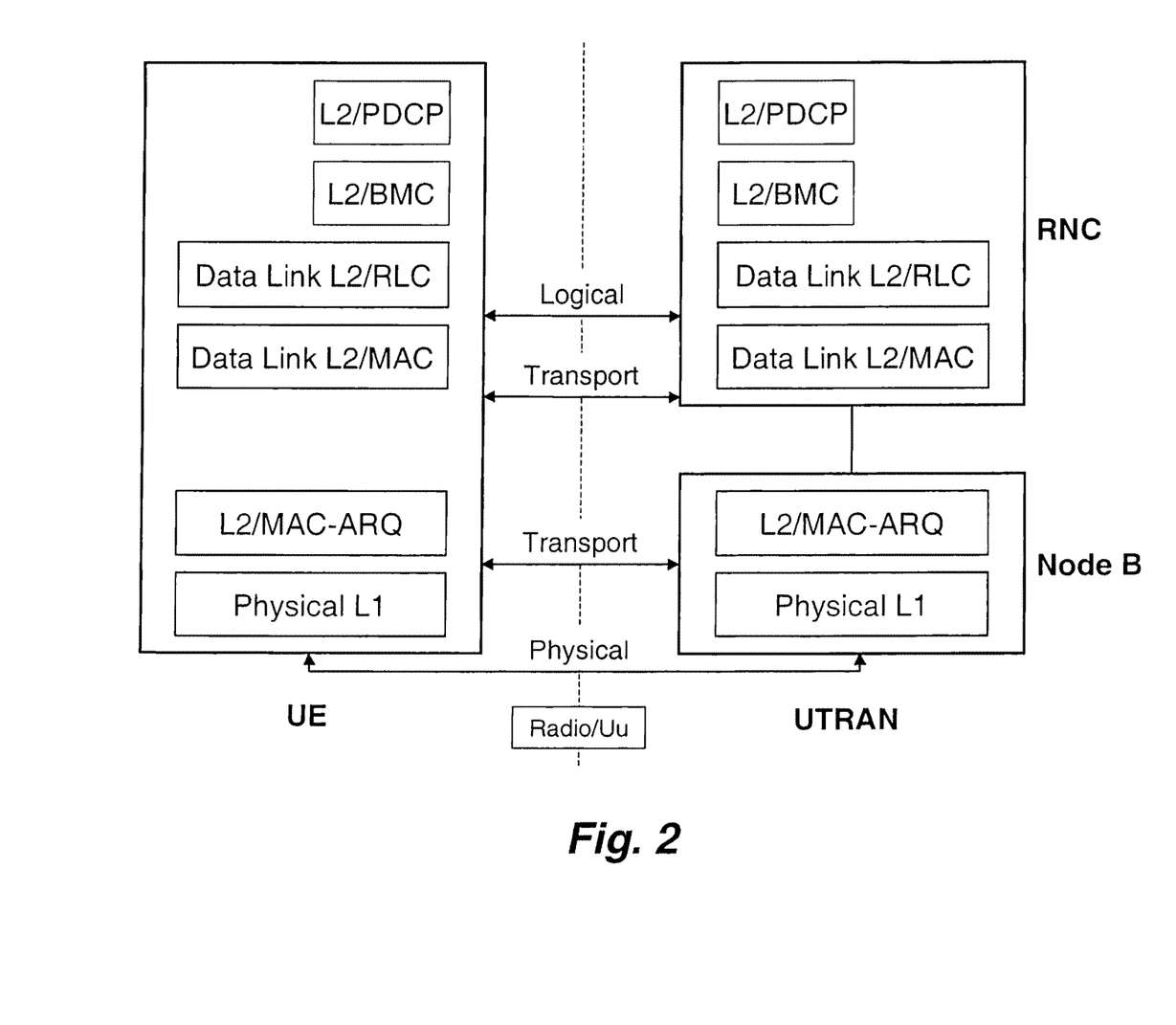
FIG. 2 displays a layered protocol structure, according to the invention, in a radio communication system.

FIG. 2 shows a preferred layered protocol structure, a protocol stack, according to the invention. The L2 MAC layer of FIG. 1 has been extended and divided into two sub-layers, a new L2 MAC sub-layer and a new MAC-ARQ sub-layer. Essentially the new L2 MAC sub-layer corresponds to the prior art L2 MAC sub-layer of FIG. 1. The MAC-ARQ plus the MAC layer could be regarded as one single MAC layer extended to also include hybrid ARQ functionality. However, for reasons of explanation they are preferably regarded as separate sub-layers. Further, on the network side, considering them as separate protocol sub-layers physically better corresponds to the physical entities where they reside. As illustrated in FIG. 2 on the UTRAN-side (or network side) L2 MAC sub-layer is preferably located in RNC, whereas L2 MAC-ARQ sub-layer is located in Node B. Hybrid ARQ protocol combine successively received retransmissions. It is a great advantage to have the hybrid ARQ protocol close to the physical layer and, particularly, in Node B. Among the advantages achieved thereby, e.g., the roundtrip delay is reduced as compared to a location in RNC. Within this patent application the protocol layers, except for L2 MAC and L2 MAC-ARQ as just explained, correspond to those of FIG. 1.

Figure 3:
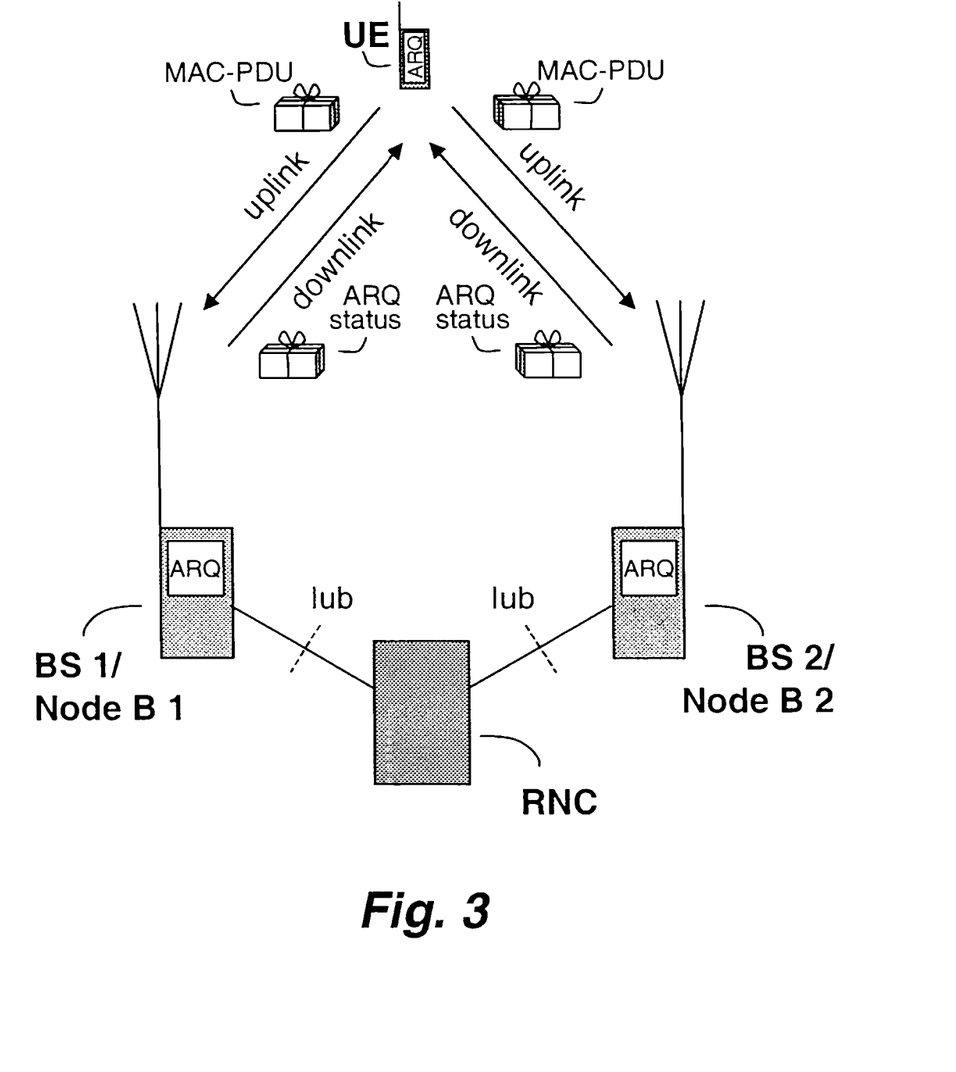
FIG. 3 shows communication, according to the invention, between a UE and a base station involved in a connection between an RNC and the UE.

With reference to FIG. 3, Node B 1 and Node B 2 of a radio communications system are logical nodes responsible for radio transmission/reception in one or more cells to/from the User Equipment UE. BS 1 and BS 2 are physical entities representing Node B 1 and Node B 2 respectively. Node B 1 and Node B 2 terminate the air interface, called Uu interface within UMTS, between UE and respective Node B towards the radio network controller RNC. In UMTS the interface between a Node B and an RNC is called Iub interface.

Preferably, all Nodes B of the radio communications system operate according to the invention for outstanding performance. However, the invention can also be used in systems also including Nodes B not operating according to the invention.

Figure 4:
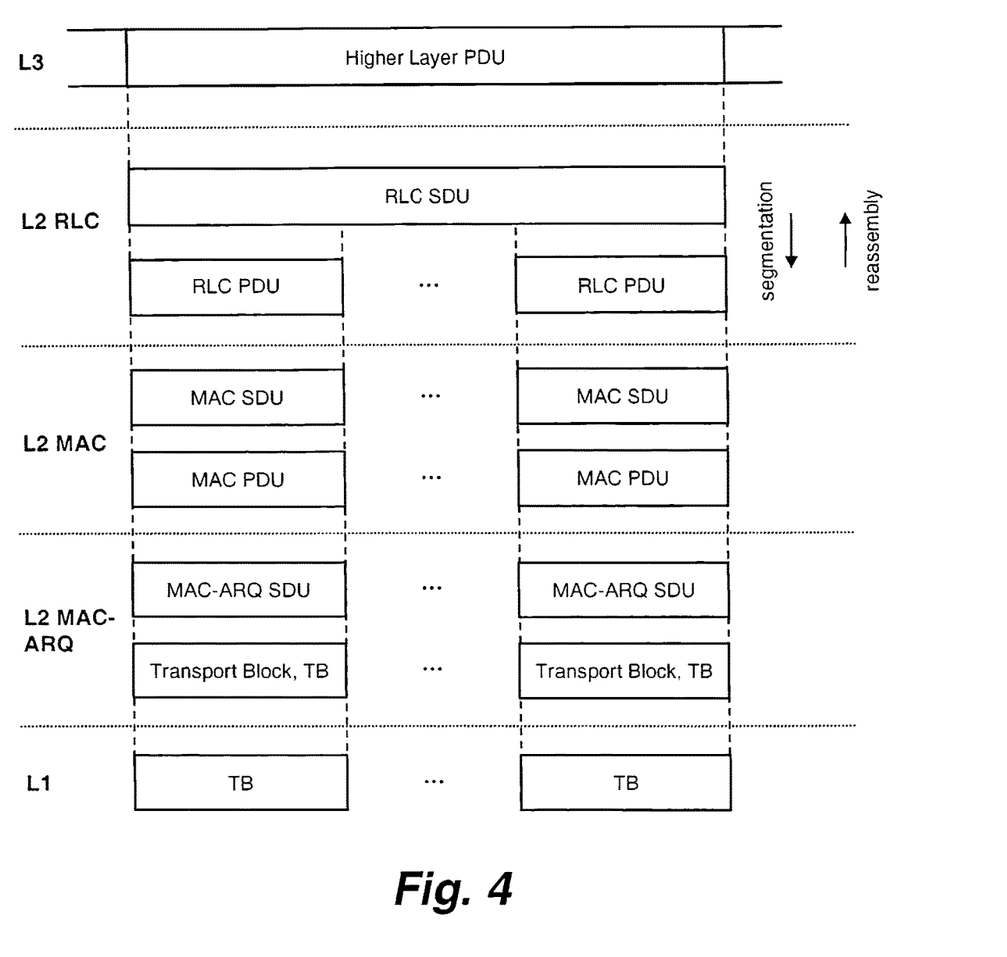
FIG. 4 schematically illustrates MAC and RLC protocol layers, according to the invention, in a multilayer protocol structure.

FIG. 4 describes somewhat more detailed than FIG. 2 the information transfer between the sub-layers of the protocol stack. In an exemplary situation, and with reference to FIG. 3, UE communicates over a radio link associated with BS 1. Packet switched data is transmitted in protocol data units, PDUs, in both directions. Each PDU is transported on a transport channel in at least one transport block, TB, as shown in FIG. 4. Preferably there is one TB for each PDU. As described above, transmission errors on the transport channel are corrected and detected by layer L1. Each transport block, TB, in FIG. 4 can be provided an individual CRC error-detecting checksum prior to transmission on the physical channel. However, preferably a transmission unit, carrying one or more TBs, is provided only one CRC error-detecting checksum. If a transmission unit is detected to be in error on the receiving side, this is reported to the L2 MAC layer.

L2 MAC layer can request retransmission of transmission units received in error. Transmission units, detected to be in error, still carry information that should not be wasted. Preferably hybrid ARQ, utilizing information available from earlier transmission(s) of a transmission unit by proper combining with the latest retransmission, is used prior to an L2 MAC layer request for retransmission.

It is preferred that the Hybrid ARQ is terminated in Node B. Given L2 RLC located in RNC, the RLC layer should not be responsible of Hybrid ARQ. According to preferred embodiments of the invention, an L2 MAC-ARQ sub-layer is responsible of Hybrid ARQ. At UTRAN-side the L2 MAC-ARQ sub-layer is located in Node B.

One reason for terminating the Hybrid ARQ in Node B is the reduction of roundtrip delay as compared to terminating it in RNC. Another reason is that Node B is capable of using soft combining of multiply transmitted data packets, whereas RNC generally only receives hard-quantized bits.

At the receiving end, error detection is also performed by layer L2 RLC of FIG. 4. If an RLC protocol data unit, PDU, is received in error or the PDU is missing, it will be requested for retransmission at a point in time when a status report is established by the RLC layer. RLC PDUs are transferred to/from the MAC layer SDUs. The MAC SDU (Service Data Unit) possibly includes a header not included in the RLC PDU. As explained in relation to FIG. 2, according to the invention there are preferably two UTRAN MAC sub-layers, an L2 MAC sub-layer and an L2 MAC-ARQ sub-layer. In a preferred embodiment of the invention, the L2 MAC sub-layer is located in RNC and the L2 MAC-ARQ sub-layer is located in Node B. As previously described, the RLC PDUs are transferred in transport blocks, TBs, on the physical channel. In the uplink direction the L2 MAC-ARQ layer transfers TBs, possibly after combining of multiple (re-)trans-missions of the respective TBs, indicated to be error-free to the L2 MAC layer.

A network layer PDU or L3 PDU can comprise several RLC PDUs, as illustrated in FIG. 4. RLC PDUs are reassembled into RLC service data units, RLC SDU, prior to delivery to higher layer PDU. The L3 protocol can be, e.g., the Internet Protocol, IP. Upon reception from L3, RLC SDUs are segmented into RLC PDUs.

Figure 5:
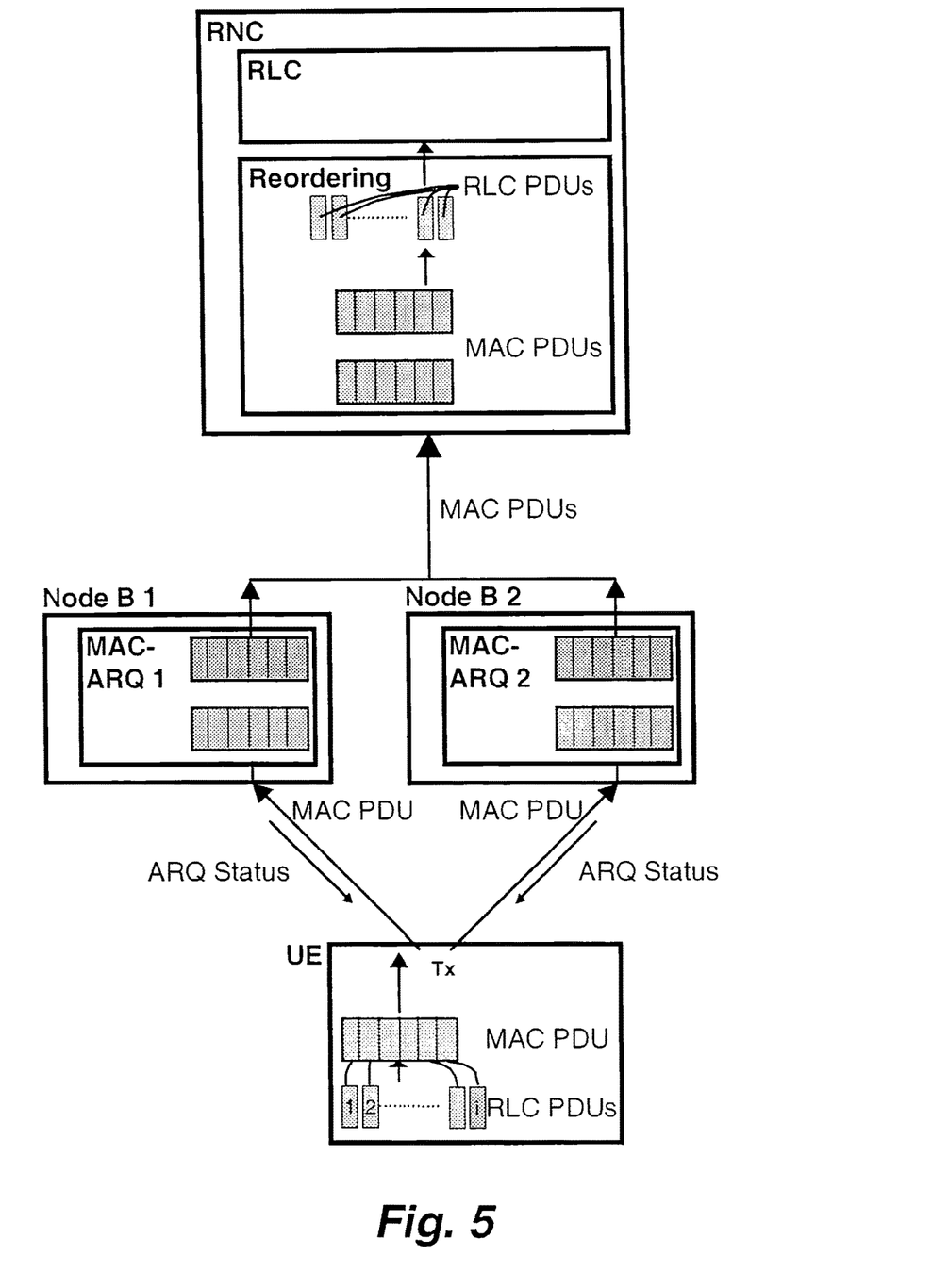
FIG. 5 gives an overview of the uplink protocol structure according to a preferred embodiment of the invention.

FIG. 5 gives an overview of the uplink protocol structure according to the preferred embodiment of the invention. «RNC», «Node B 1», «Node B 2» and «UE» have been described in relation to FIG. 3. «MAC-ARQ 1» and «MAC-ARQ 2» are MAC-ARQ protocol layers according to the invention of Nodes B «Node B 1» and «Node B 2» respectively. In User Equipment «UE», an integer number of RLC PDUs «1», «2», . . . , «i» are segmented into a MAC-layer PDU «MAC PDU» adapted for uplink transmission in one transmission time interval, TTI. Preferably, uplink transmissions are performed on an enhanced uplink channel with transmission time intervals shorter than transmission time intervals of prior art. Each Node B «Node B 1», «Node B 2» (positively) acknowledges «ARQ Status» successfully received MAC PDUs. Optionally, it may negatively acknowledge «ARQ Status» unsuccessfully received MAC PDUs. The acknowledgements are transmitted in downlink direction to User Equipment «UE». With only positive acknowledgements, if no acknowledgement is received within a predetermined time, «UE» retransmits the unacknowledged MAC PDU, otherwise «UE» cancels the MAC PDU from buffer storing not yet acknowledged MAC PDUs. With optional negative acknowledgements the predetermined time period becomes less critical. However, due to the risk of misinterpreting a negative acknowledgement as a positive acknowledgment, channel dependent probability of such misinterpretation needs to be considered for various channel environments for an optimum selection.

MAC PDUs received by respective MAC-ARQ protocol layer «MAC-ARQ 1», «MAC-ARQ 2» of Nodes B «Node B 1», «Node B 2» are delivered to Radio Network Controller «RNC», which reorders received MAC PDUs into sequential order. This is needed as, e.g., a single Node B may obtain successfully transmitted and received MAC PDUs out of order due to varying number of required retransmissions of different PDUs. Another exemplary reason is that at handover involving a plurality of Nodes B, different MAC PDUs of an RLC PDU are received and (re-)transmitted to RNC at different Nodes B for assembly in RNC, whereas for downlink transmissions there is only one transmitting entity (Node B) and one receiving entity (UE).

A reordering entity in radio network controller «RNC» provides in-sequence delivery of RLC PDUs «RLC PDUs», received in RNC, to RLC layer «RLC». Two alternative number sequences for reordering are considered:

reordering based on RLC sequence numbers for both UM and AM RLC; or special sequence numbers on MAC level.

Special sequence numbers on MAC level is used for downlink HS-DSCH. However, if reordering is made in RNC number of sequences can be reduced if reordering is based on RLC sequence numbers, keeping transmission overhead at a minimum.

The risk of receiving duplicate RLC PDUs also needs consideration. Elimination of duplicate RLC PDUs can be based on RLC sequence numbers as well. The elimination of duplicate RLC PDUs also reduces the negative impact of positive acknowledgements being received as negative acknowledgments in UE, if negative acknowledgments are made use of.

Figure 6:
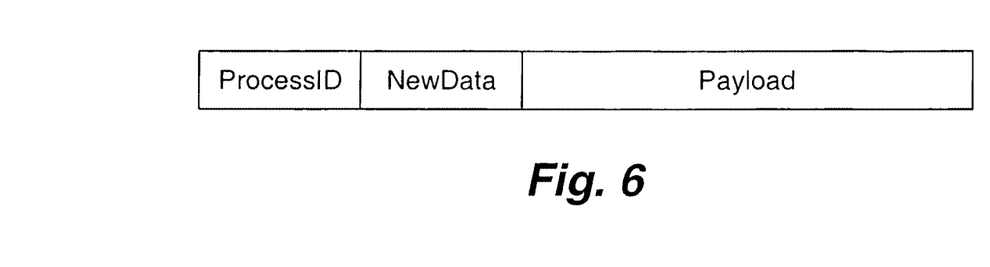
FIG. 6 shows a MAC PDU according to the preferred embodiment of the invention.

Preferably, hybrid ARQ is used, softly combining, if more than one, successive received (re-)transmissions of each MAC PDU. An identification of process identity «ProcessID» and an indicator of new data «NewData» in addition to payload «Payload» may either be included in data packets «MAC PDU» according to the HARQ protocol as indicated in FIG. 6 or be handled separately but in association with payload data, illustrated in FIG. 7. The payload field «Payload» comprises an integer number of RLC PDUs. The indicator of new data «NewData» indicates whether or not a MAC PDU is a retransmission and is included for control of soft combining. This may be explicitly indicated, or indicated implicitly by a sequence number, which is increased for each transmission of a not earlier transmitted MAC PDU.

Figure 7:
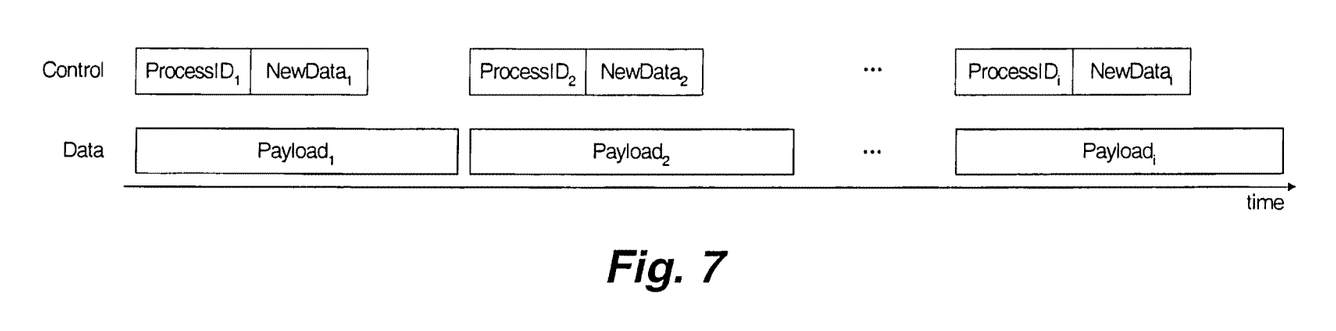
FIG. 7 illustrates transmission of data and associated control fields on separate channels, according to the invention.

There is need for greater reliability at transmission of process identity and new data indicator fields «ProcessID», «NewData», than payload. If control data is not received, corresponding payload cannot be soft-decision combined with data of other transmissions. Therefore, control fields «ProcessID» and <<NewData» are transferred with higher reliability than the data channel transferring the payload. The higher reliability can be achieved by, e.g., more error resistant error control coding or increased transmission power. Preferably, control fields for process identity «ProcessID» and new data indicator «NewData» are transmitted on a control channel separate from the data channel. The control and data channels are synchronized.

In addition to the control fields mentioned above there are control fields of nature well known in the art carrying in-formation on, e.g., number of payload RLC PDUs and transport block size.

A well-known (one-channel) stop-and-wait ARQ protocol does not provide sufficient throughput for most studied relevant cases. According to the invention selective repeat or N-channel stop-and-wait ARQ is preferred.

Figure 8:
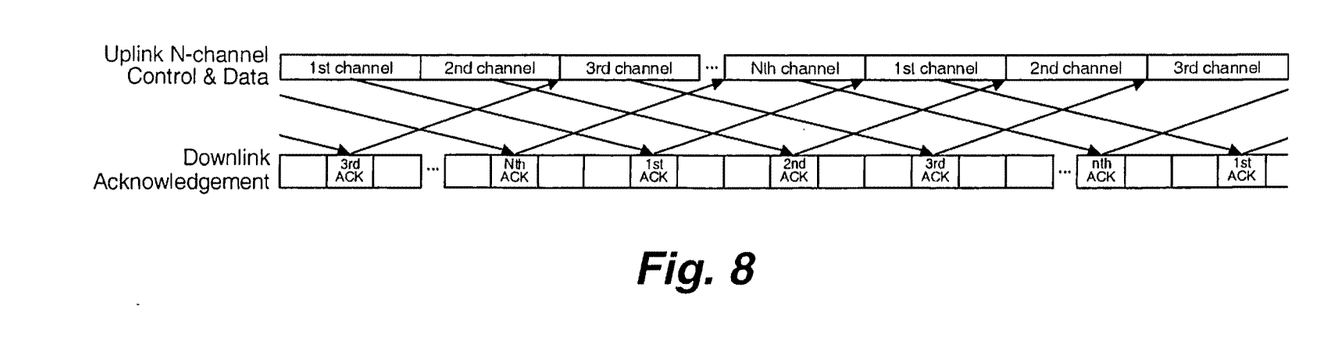
FIG. 8 illustrates N time multiplexed channels for N channel stop-and-wait according to the preferred embodiment of the invention.

For N-channel stop-and-wait, Node B needs to store soft samples of up to N different MAC PDUs for each UE. The N channels are time multiplexed as illustrated in FIG. 8. For a particular channel, no further data is transmitted until an acknowledgement is received or time for acknowledgement has elapsed according to a stop-and-wait protocol. I.e. acknowledgements are scheduled such that acknowledgement «1st ACK» acknowledging data transmitted in a 1st channel «1st channel» arrives not later than next transmission instant of 1st channel «1st channel». The same holds for 2nd channel «2nd channel» up to Nth channel «Nth channel» FIG. 9 displays an RNC according to the invention. Receive means 1 receives first protocol data units, e.g. MAC PDUs, transferred from one or more Nodes B. Received first protocol data units are stored by buffering means 2. The first protocol data units are segmented into second protocol data units, e.g. RLC PDUs, by segmentation means 3. Reorder means 4 operates on the segmented buffered data units and reorders the second protocol data units as need be in consecutive order according to a sequence number. For transfer to higher layers, reassemble means 5 reassembles the second protocol data units into service data units, which are transferred by transfer means 6.

Figure 9:
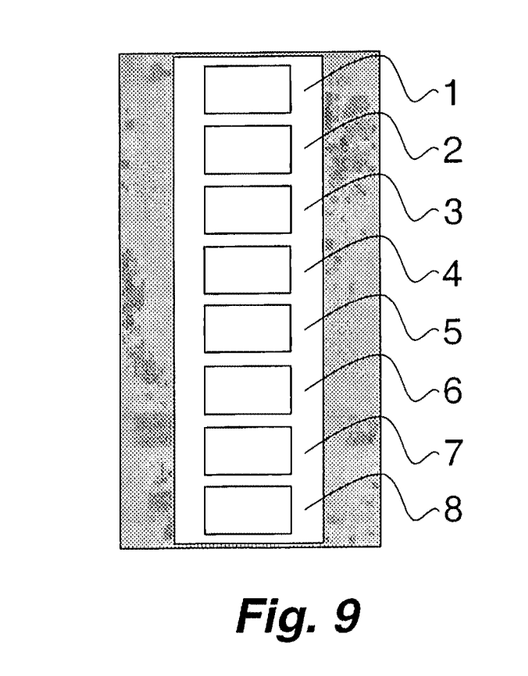
FIG. 9 displays an RNC according to the invention.

The radio network further comprises processing means 7, verifying second protocol data units according to an error detecting code. Acknowledgments, preferably included in status reports, of second protocol data units are transmitted by transmit means 8.

Figure 10:
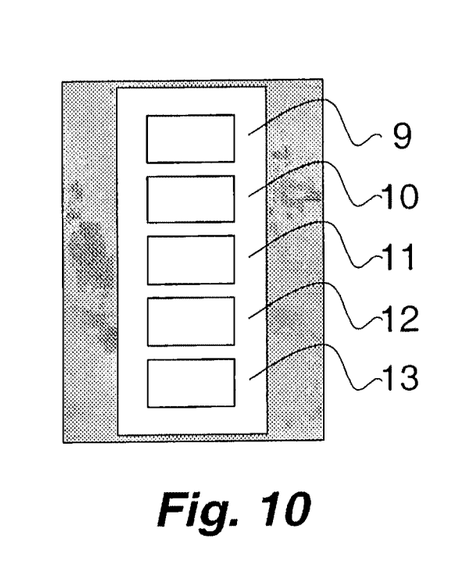
FIG. 10 displays a Node B according to the invention.

FIG. 10 displays a Node B according to the invention. Node B transmits responses to UE providing information on the outcome of data transfers over the radio interface from UE to Node B. In an example situation receive means 9 receive one or more first protocol data units, e.g. MAC PDUs, the received first protocol data units are stored in buffering means 10 and processed in protocol entity 11 determining, among other things, whether the received data unit is valid codeword. Transmit means 12 accordingly acknowledges the received data unit to the sender (UE). When a multitude of transmissions are required for obtaining a valid received protocol data unit, the number of (re-)transmissions may be reduced by properly combining the transmissions. Optional combining means 13, performs such combining, preferably using soft decision information from the receive means 9.

Figure 11:
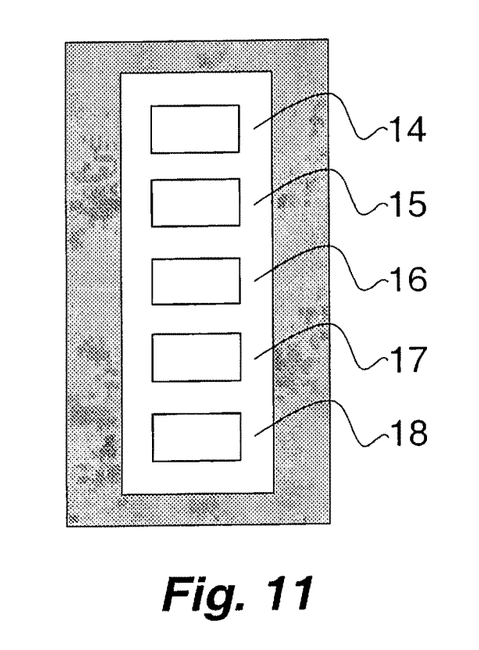
FIG. 11 displays a User Equipment according to the invention.

FIG. 11 displays a User Equipment, UE, according to the invention. Assemble means 14 assembles second protocol data units, e.g. RLC PDUs, to first protocol data units, e.g. MAC PDUs. The first protocol data units are buffered by buffering means 15 and transmitted one or more times, as need be, by transmit means 16. If transmission is considered successful according to, appeared or non-appeared, acknowledgements, positive or negative acknowledgements of first protocol data units are received by receive means 17. Positive or negative acknowledgments of second protocol data units are received by receive means 18 optionally distinguishing from receive means 17.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs. Further, protocols and layers are referred to in close relation with UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method performed by a radio network controller of a radio communications system, the method comprising:
    receiving first protocol data units from one or more base stations, the first protocol data units having one or more second protocol data units assembled therein;
    buffering received first protocol data units;
    identifying two first protocol data units that are the same, or were identically assembled, the two first protocol data units transmitted from a user equipment via two base stations;
    keeping a first of the two identified first protocol data units that are the same, or were identically assembled and discarding a second of the two identified first protocol data units that are the same, or were identically assembled;
    segmenting the first received first protocol data unit into second protocol data units;
    reassembling second protocol data units into service data units; and
    transferring service data units.

2. The method of claim 1 further comprising reordering the second protocol data units.

3. The method of claim 1 further comprising reordering the first protocol data units.

4. The method of claim 1 further comprising:
    verifying the second protocol data units according to an error detecting code; and
    transmitting positive or negative acknowledgments depending on whether or not the second protocol data unit is detected to be erroneous.

5. The method of claim 1 further comprising reordering the second protocol data units according to an RLC sequence number.

6. The method of claim 1 further comprising receiving first protocol data units concerning a particular connection from a plurality of first protocol data senders.

7. The method of claim 1 wherein the first protocol data units are MAC PDUs.

8. The method of claim 1 wherein the second protocol data units are RLC PDUs.

9. The method of claim 1 wherein the radio network controller is a radio network controller of a UMTS or WCDMA system.

10. A radio network controller of a radio communications system comprising:
    receive means, for receiving first protocol data units from one or more base stations, the first protocol data units having one or more second protocol data units assembled therein;
    buffering means, for buffering received first protocol data units;
    identification means, for identifying two first protocol data units that are the same, or were identically assembled, the two first protocol data units transmitted from a user equipment via two base stations, wherein a first of the two identified first protocol data units that are the same, or were identically assembled is kept and a second of the two identified first protocol data units that are the same, or were identically assembled is discarded;
    segmentation means, for segmenting the first received first protocol data unit into second protocol data units;
    reassemble means, for reassembling second protocol data units into service data units; and
    transfer means, for transferring the service data units.

11. The radio network controller according to claim 10 further comprising:
    processing means arranged to verify the second protocol data units according to an error detecting code, and
    transmit means arranged to transmit positive or negative acknowledgments depending on whether or not the second protocol data unit is detected to be erroneous.

* * * * *